United States Patent [19]
Culver

[11] Patent Number: 5,666,138
[45] Date of Patent: Sep. 9, 1997

[54] INTERFACE CONTROL

[76] Inventor: Craig F. Culver, 201 Ware Rd., Woodside, Calif. 94062

[21] Appl. No.: 343,300

[22] Filed: Nov. 22, 1994

[51] Int. Cl.$^6$ ........................................... G09G 5/08
[52] U.S. Cl. ........................ 345/161; 345/157; 345/184
[58] Field of Search ............................... 345/157, 161, 345/184, 168; 463/36, 38

[56] References Cited

U.S. PATENT DOCUMENTS

| | | | |
|---|---|---|---|
| 5,065,145 | 11/1991 | Purcell | 345/157 |
| 5,086,296 | 2/1992 | Clark | 345/157 |
| 5,202,961 | 4/1993 | Mills et al. | 345/157 |
| 5,313,229 | 5/1994 | Gilligan et al. | 345/157 |
| 5,329,289 | 7/1994 | Sakamoto et al. | |
| 5,474,082 | 12/1995 | Junker | 345/157 |
| 5,550,563 | 8/1996 | Matheny et al. | 345/157 |

FOREIGN PATENT DOCUMENTS

| | | | |
|---|---|---|---|
| 59-160229 | 9/1984 | Japan | 345/161 |
| 83-820012 | 1/1983 | U.S.S.R. | 345/157 |

Primary Examiner—Richard Hjerpe
Assistant Examiner—Juliana S. Kim
Attorney, Agent, or Firm—Skjerven, Morrill, MacPherson, Franklin & Friel

[57] ABSTRACT

An improved interface control advantageously may be operated by one hand. A thumbpiece is slidably disposed within a longitudinal arm member which moves in an arcuate path. Placing his or her thumb in the thumbpiece, a user controls the horizontal positioning of a cursor by moving the arm member along the arcuate path. Vertical positioning of the cursor is controlled by sliding the thumbpiece along the length of the arm member. Trigger functions are implemented by exerting a downward force on the thumbpiece. Since the downward force used to implement the trigger function is orthogonal to motions used to control positioning of the cursor irrespective of the particular positions of the arm member and thumbpiece, the disclosed interface control prevents a user from inadvertently altering the positioning of the cursor during implementation of the trigger function. The arm member and sliding thumbpiece emulate the natural pivoting and curling/extending motions of the thumb, thereby resulting in a precise, easy to use, and ergonomically superior interface control.

23 Claims, 7 Drawing Sheets

INTERFACE CONTROL

FIELD OF THE INVENTION

The present invention relates to an interface control. More particularly, the present invention relates to an interface control device which allows a user to control the operation of computer applications, machinery, and video games.

BACKGROUND OF THE INVENTION

Joystick controls have been employed in a wide variety of applications, including computer software, industrial machinery, and multimedia interfaces to control the positioning of an object displayed on a screen, such as a cursor or pointer. A typical prior art joystick includes a gimballed stick pivotally coupled to a flat base portion. Angle sensors coupled to the gimballed stick generate position control signals in response to a user pivoting the gimballed stick relative to the base portion. These control signals are used to manipulate the position of the cursor. A depressible switch coupled to the top of the stick is used to generate a trigger control signal for implementing various functions, such as selecting items from a pull down menu or causing a character in a video game to jump.

The structure of these gimballed joystick controllers makes them somewhat difficult to operate. Rotating the arm and wrist to control positioning functions (i.e., pivoting the stick) while pressing downward with the thumb or finger to manipulate trigger functions requires a fair amount of practice and coordination. Further, requiring a user to simultaneously combine these motions may lead to an inadvertent change in the positioning of a cursor while implementing a trigger function. For instance, in a point-and-shoot operation, where a user first positions the cursor onto a target on the display screen and then activates the trigger function, depressing the trigger switch with the thumb or finger often results in slight movements of the arm and/or wrist, thereby causing the cursor to slip off the target. This phenomenon is commonly referred to as cursor creep.

The conventional joystick controller described above has the further disadvantage of undesirably requiring the use of two hands, i.e., one hand to hold the base of the controller and the other hand to operate the controller's stick. The only manner in which these controllers may be operated with one hand is to place the controller on a table or other flat surface.

Other joystick controllers have been developed in response to the above-mentioned problems. One such controller includes a pivoting, handgrip-shaped stick having one or more squeezable trigger switches built into a side portion of the handgrip. The positioning of an image is controlled by pivoting the handgrip, while the trigger functions are controlled by squeezing the trigger switches with the fingers. Although in such a design the positioning controls are somewhat isolated from the trigger function controls (i.e., squeezing the trigger switch with the index finger is not likely to cause as much of an inadvertent change in position as would depressing a trigger switch on the top of the stick with the thumb), cursor creep is nevertheless a problem. Further, such a controller requires the use of two hands or, alternatively, a tabletop support.

Some have attempted to develop a one-handed controller by simply reducing the size of conventional joystick controllers. These controllers fit within a user's hand, where the thumb, resting atop the stick, controls the positioning function. The trigger function is controlled by squeezing a trigger switch located on the side of the controller's stick.

These miniaturized versions of conventional joystick controllers are for the most part clumsy and ineffective. Merely reducing the size of a controller designed for two-handed operation so as to be operated by one hand severely limits the precision with which a user may control a cursor. Further, these miniaturized controllers are ineffective in isolating trigger controls from positioning controls. Indeed, squeezing a trigger switch with, for example, the index finger typically causes the controller stick to move forward, thereby resulting in undesirable vertical cursor creep.

Figure 1:
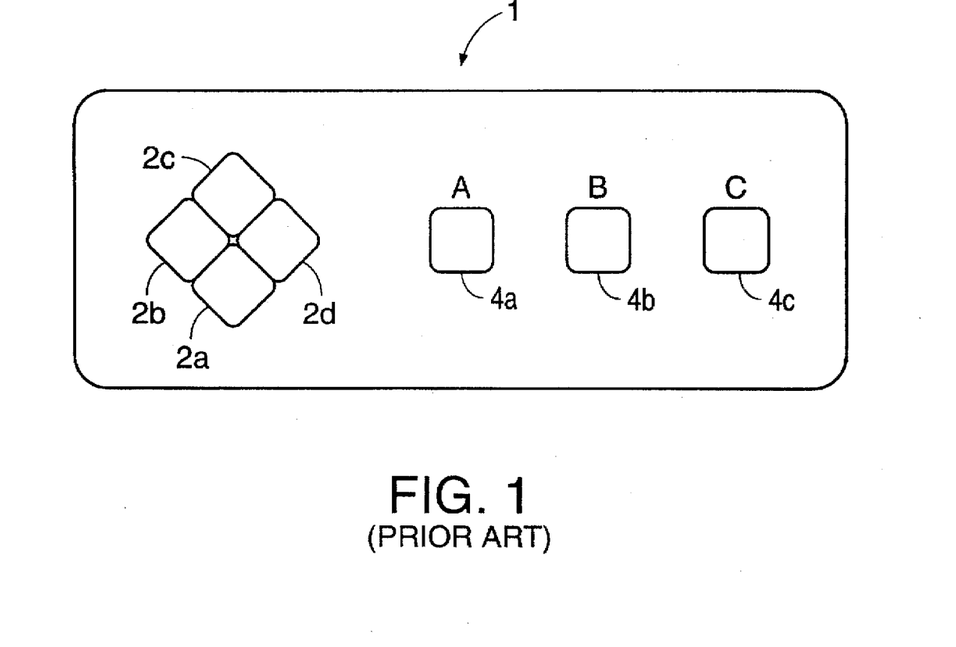
FIG. 1 is a prior art four-key cluster joystick controller.

This undesirable interaction between positioning and trigger controls of miniature joystick controllers, coupled with users' complaints of inferior ergonomics, has led others to revert to the more primitive two-handed video game controller shown in FIG. 1. Controller 1 has four keys 2a–2d clustered together in a first portion of controller 1 and three keys 4a–4c grouped together in a second portion of controller 1. Keys 2a–2d control the positioning of a displayed object (such as the hero of the video game) by generating digital positioning signals in response to a user depressing one or more of keys 2a–2d. Keys 4a–4c control various trigger functions (i.e., start-stop, jump, shoot, for example). The controller shown in FIG. 1, although virtually eliminating inadvertent interaction between positioning and trigger controls, nonetheless requires the use of two hands.

Thus, there is a need for joystick controller which may be operated in one hand. There is also a need for a controller having improved precision and ergonomics. Such a device should also isolate positioning and trigger controls, thereby eliminating cursor creep and other inadvertent position control signals produced during activation of trigger functions.

SUMMARY OF THE INVENTION

In accordance with the present invention, an interface control is disclosed which offers users superior performance and ergonomics. In the preferred embodiment, a thumbpiece is slidably disposed within a longitudinal arm member having a first end pivotally coupled to a fixed point. The arm member may pivot about the fixed point such that a second end portion of the arm member follows an arcuate path having as its center the fixed point. The thumbpiece slides back and forth along the longitudinal axis of the arm member. A first sensor coupled to the arm member in a region proximate to the fixed point senses the angular position of the arm member. A second sensor coupled to the thumbpiece senses the linear movement of the thumbpiece relative to and longitudinally along the arm member. A third sensor coupled to the thumbpiece senses a downward force exerted upon the thumbpiece.

The interface control may, in one embodiment, comfortably rest in the palm of a user's hand. Positioning the fingers along the underside of the interface control, a user places the thumb in the thumbpiece. The user controls the horizontal positioning of, for example, a cursor by causing the arm member to pivot either to the right or to the left about the fixed point. This motion is detected by the first sensor, which in response thereto causes the cursor to move either right or left, respectively, on a display screen. The vertical positioning of the cursor is controlled by sliding the thumbpiece along the length of the arm member. The second sensor detects this linear movement of the thumbpiece and, in response thereto, causes the cursor to move up and down on the display screen. A user may implement trigger functions by exerting a downward force on the thumbpiece. This pressure is detected by the third sensor which, in turn, causes some predetermined function to be implemented on the display screen.

In another embodiment, the longitudinal arm member is disposed within a track defining an arcuate path rather than being coupled to a fixed pivot point. In this embodiment, positioning and trigger functions are controlled in the same manner as described in the preferred embodiment. By moving the arm member along the arcuate path as defined by the track, the thumbpiece follows an arcuate path having as its center a virtual pivot point. A sensor coupled to the arm member senses the arcuate movement of the arm member relative to the interface control and in response thereto generates a horizontal positioning control signal. The vertical positioning of the cursor and trigger functions are implemented as described above in connection with the preferred embodiment.

Embodiments of the present invention isolate the trigger function from the positioning controls. The downward force used to implement a trigger function will always be orthogonal to those motions of the thumb which are used to control the positioning of the cursor, regardless of the positions of the arm member or thumbpiece. This orthogonal relationship prevents a user from inadvertently altering the positioning of the cursor when trying to implement a trigger function.

Embodiments in accordance with the present invention also achieve superior ergonomics. The arm member is preferably of a length approximately equal to that of an adult thumb where different length arm members can be provided for different size hands. Together the arm member, which rotates to form an arcuate path, and the thumbpiece, which slides along the length of the arm member, emulate the natural pivoting and curling/extending motions of the thumb, respectively. The result is a comfortable, precise, and easy to use interface control.

In another embodiment, additional trigger switches are provided within cavities formed in the underside of the interface control. The fingertips of the user's hand, each comfortably nestled within an associated cavity, control the operation of the additional trigger switches, which may be used to implement numerous other functions.

Embodiments of the present invention are usable as an interface between a user and a machine where the machine carries out some predetermined function in response to commands issued by the user. In one embodiment, for instance, the user may control the mechanical operation of construction equipment. In another embodiment, the user may control moveable elements on a display screen, such as a cursor in a software application or an object in a video game.

This invention will be more fully understood in view of the following description taken together with the drawings.

DETAILED DESCRIPTION OF THE PREFERRED EMBODIMENTS

Figure 2:
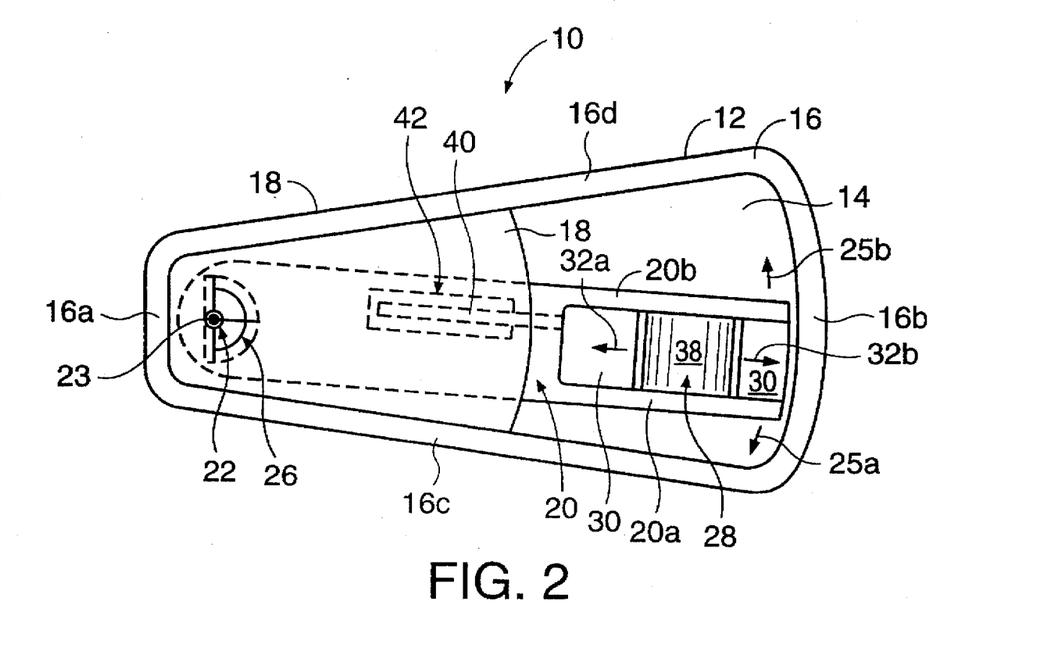
FIG. 2 is a plan view of one embodiment in accordance with the present invention.

In accordance with the present invention, an interface control is disclosed which allows a user to simultaneously control both a trigger function and the positioning of a cursor through a single contact surface using only the thumb. In the preferred embodiment shown in FIGS. 2, 3A, 3B, 4 and 5, a hand-held interface control 10 is provided in support 12 which includes base plate 14 and side wall 16 having first rounded end portion 16a, second rounded end portion 16b, and side portions 16c, 16d connecting rounded end portions 16a,16b. Top plate 18 (FIGS. 3A and 3B) is provided above side wall 16 and encloses a portion of support 12. Longitudinal arm member 20 (FIGS. 2, 3A, 3B, 4, 5) is disposed in and pivotally connected to support 12 (FIG. 2) at point 22. Arm member 20 may be connected to support 12 by any suitable means, such as bolt 23 (FIGS. 2, 3A, 3B, 4, 5), or an appropriate bearing surface which allows arm member 20 to pivot about point 22 as indicated by arrows 25a, 25b (FIG. 2). As will be explained below, the resistance provided between (1) arm member 20 and base plate 14 and (2) thumbpiece 28 and arm member 20 may be adjusted to a level suitable to the needs of a particular user or application.

First sensor 26 (FIGS. 2, 3A, 3B) is coupled to arm member 20 and senses the angular rotation of arm member 20 about point 22. First sensor 26, preferably a rotary resistive potentiometer although other appropriate sensing structures such as capacitive sensors, for example, can also be used, generates first positioning signals indicative of the direction and magnitude of arm member 20's rotation about point 22.

Figure 3A:
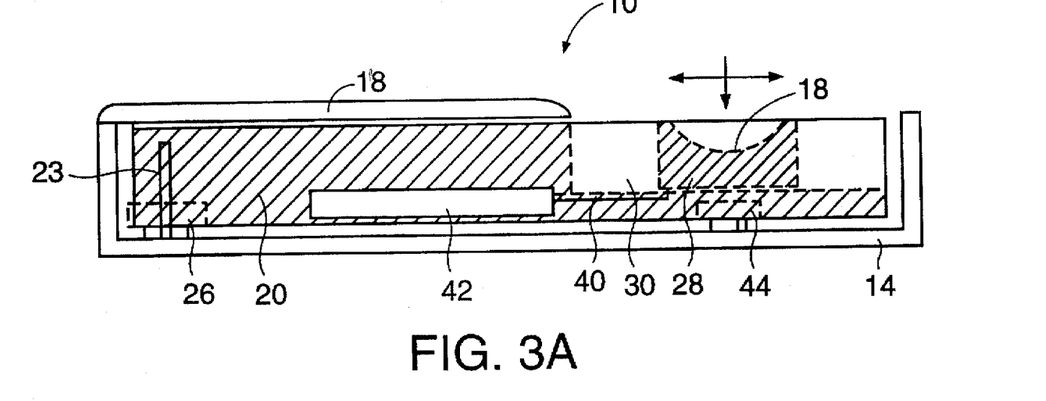
FIGS. 3A and 3B are side and end views of the embodiment of FIG. 2, respectively.
Figure 4:
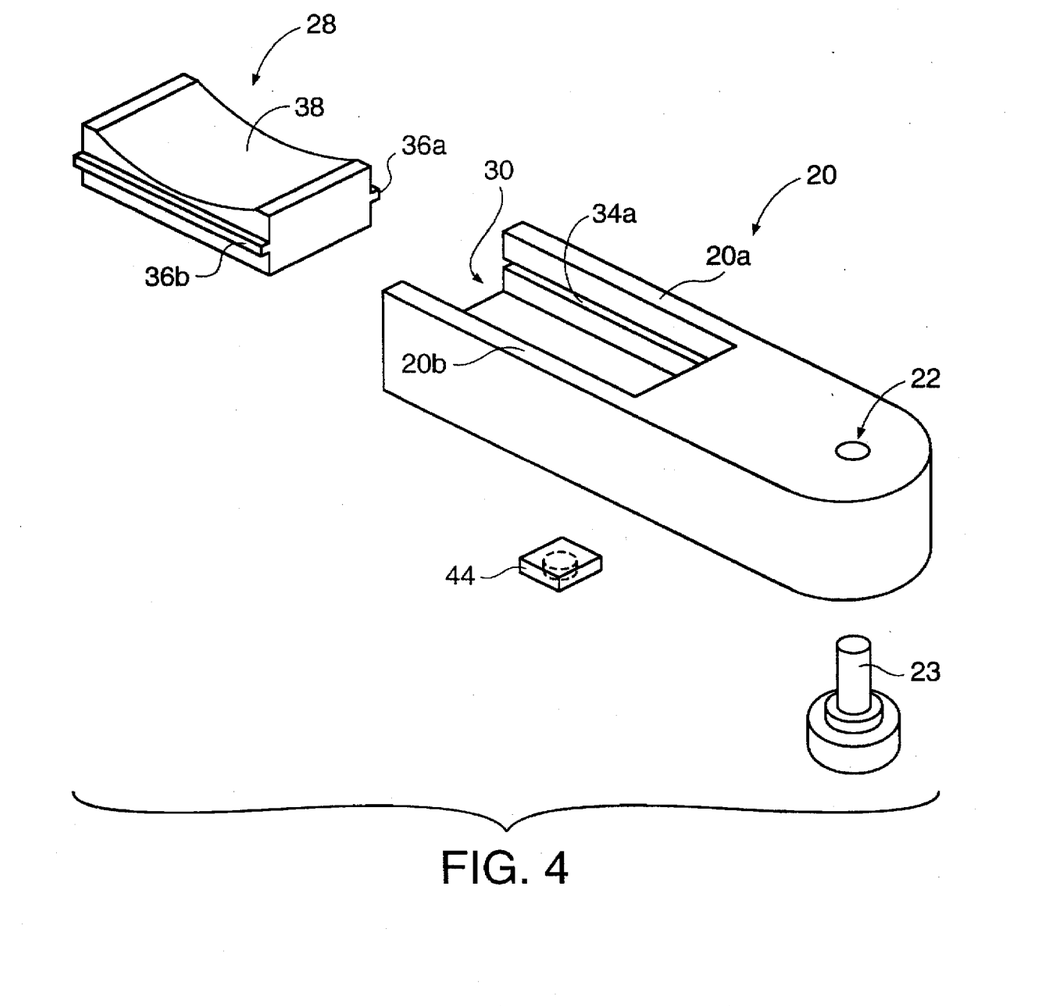
FIG. 4 is a perspective view of a portion of the embodiment of FIG. 2.

Referring to FIGS. 3A and 4, arm member 20 has cavity 30 formed at one end thereof. Cavity 30 is bounded on either side by side walls 20a, 20b which have formed therein grooves 34a, 34b (groove 34b, which is formed within side wall 20b, is not shown in FIG. 4).

Figure 3B:
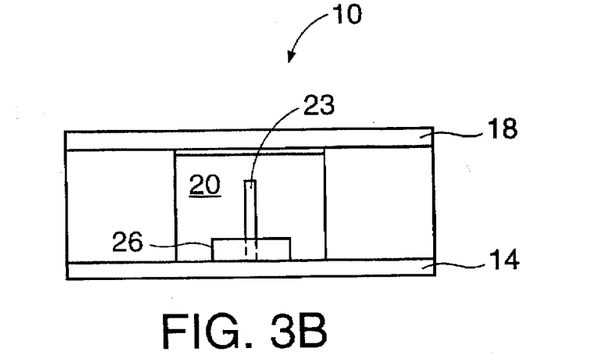

Thumbpiece 28 (FIGS. 2, 3A, and 4) is slidably mounted within cavity 30 of arm member 20 and may slide along the length of arm member 20, as indicated by arrows 32a, 32b (FIG. 2). Outwardly protruding flanges 36a, 36b (FIG. 4) provided on the sides of thumbpiece 28 matingly couple with grooves 34a, 34b formed in side walls 20a, 20b, respectively, of arm member 20 to facilitate the sliding of thumbpiece 28 along the length of arm member 20. Curved contact surface 38, which is provided on a top surface of thumbpiece 28, engages the thumb of a user operating hand-held interface control 10 (FIGS. 2, 3A, and 3B).

Shaft 40 (FIGS. 2, 3A) has a first end fixably mounted to a bottom surface of thumbpiece 28 and a second end slidably disposed within second sensor 42. Second sensor 42, which is disposed within arm member 20, detects the linear movement of shaft 40 (and thus the linear movement of thumbpiece 28) relative to sensor 42 and generates second positioning signals indicative of the position of thumbpiece 28 relative to arm member 20.

Second sensor 42 is preferably a linear resistive potentiometer. If a rotary potentiometer is used as second sensor 42, thumbpiece 28 may be coupled to the potentiometer by a conventional rack and pinion gear. It is to be understood, however, that any other sensing device capable of detecting either motion or pressure may be used as first sensor 26 and second sensor 42 in interface control 10. Although first sensor 26 and second sensor 42 preferably produce analog positioning signals, interface control 10 may also employ sensors which produce digital positioning signals.

A third sensor 44 (FIG. 3A) is secured to a bottom surface of arm member 20 so that third sensor 44 moves with arm member 20 about point 22 (FIG. 2). A bottom surface of third sensor 44 is in contact with and slides along (when arm member 20 pivots about point 22) a top surface of base plate 14 (FIG. 3A). When a user exerts a downward pressure upon thumbpiece 28, third sensor 44 engages base plate 14 and in response thereto generates a trigger control signal. Third sensor 44 may be any conventional pressure sensitive device which converts a pressure into an electric signal. In one embodiment, third sensor 44 is a microswitch of well known design.

Figure 5:
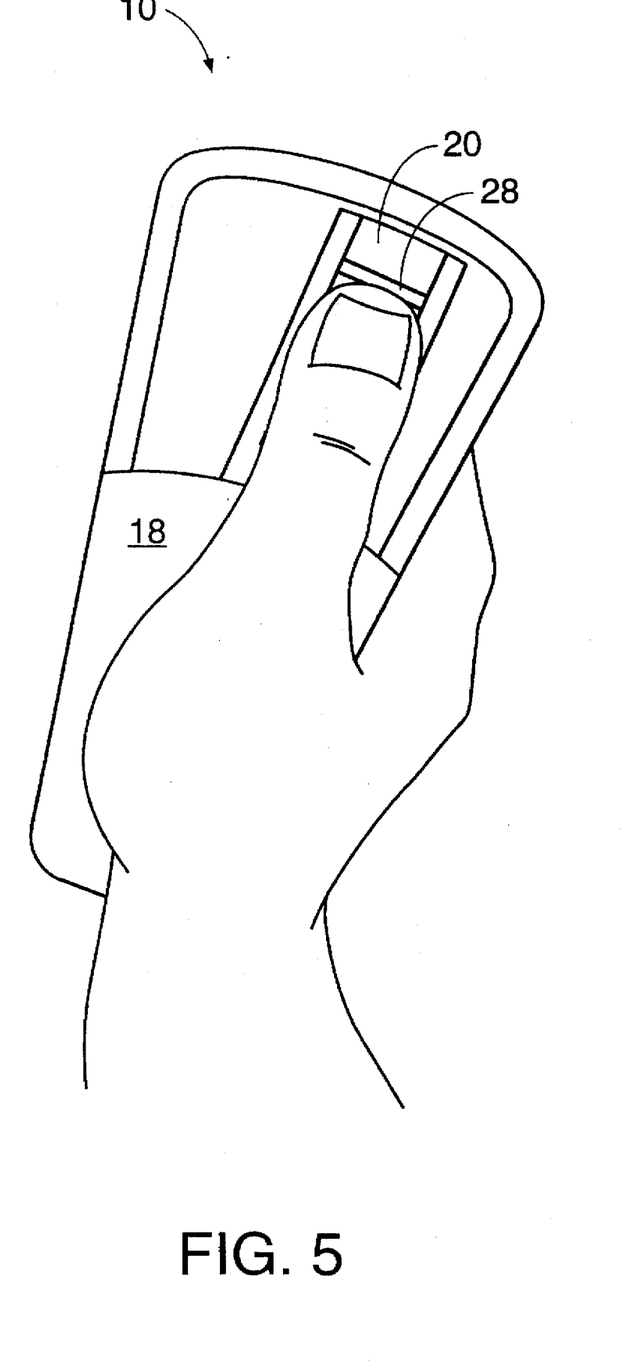
FIG. 5 shows one embodiment in accordance with the present invention resting in the palm of a user's hand.

A user cradles hand-held interface control 10 in the palm of his or her hand, positioning his fingers along the underside of bottom plate 14 and resting his thumb on curved contact surface 38 of thumbpiece 28, as shown in FIG. 5. Using only his thumb, the user may control the horizontal and vertical positioning of, for instance, a cursor on a display screen, as well as implement various related functions (such as selecting options from a pull-down menu).

The horizontal positioning of the cursor is manipulated by pivoting arm member 20 about point 22, whereby arm member 20 traces an arcuate path as indicated by arrows 25a, 25b (FIG. 2). First sensor 26, in response to the arcuate motion of arm member 20, generates a first positioning signal which controls the horizontal positioning of a cursor on a display screen indicative of the angular position of arm member 20. For instance, to move the cursor to the right on the display screen, the thumb (resting in thumbpiece 28) is used to move arm member 20 in an arcuate path to the right, as indicated by arrow 25a.

Preferably, arm member 20 is of a length (measured between portions 16a and 16b of side wall 16) approximately equal to that of the user's thumb so that when a user places the thumb on contact surface 38 of thumbpiece 28, the user's large thumb joint is immediately above point 22. The length of arm member 20 may be of varying lengths so as to accommodate different size hands. As discussed above, arm member 20, pivoting about point 22, travels in an arcuate path between sidewalls 16a, 16b of interface control 10. This arcuate path emulates the natural motion of the thumb as it pivots about the large thumb joint, thereby resulting in a natural and ergonomic relationship between the thumb and arm member 20. Hence, interface control 10 uses the natural arcuate motion of a user's thumb to effect linear changes in the horizontal positioning of a cursor on the display screen.

The vertical positioning of the cursor is controlled by sliding thumbpiece 28 along the length of arm member 20 as indicated by arrows 32a, 32b (FIG. 2). Second sensor 42 detects the linear movement of thumbpiece 28 and, in response thereto, generates second positioning signals which control the vertical positioning of the cursor. For instance, to move the cursor up or down on a display screen, the user simply uses his or her thumb to move thumbpiece 28 away from or towards point 22. This movement is easily achieved by extending or curling the thumb. Note that by positioning the fingers on the bottom side of base plate 14, the combined movement of the fingers assist the thumb in the curling and extending motions.

Trigger functions are implemented by exerting a downward pressure (using the thumb) upon thumbpiece 28. Third sensor 44 senses this downward pressure and, in response thereto, generates a trigger control signal. Depending upon the particular application with which interface control 10 is being used, this trigger control signal may implement a variety of functions. For instance, in computer software or interactive systems, this trigger control may select items from a menu. When used with a video game, for example, this trigger control may cause a character to jump.

The downward pressure exerted by the thumb to implement a trigger control signal is always orthogonal to the thumb motions used to control horizontal and vertical positioning, regardless of the angular position of arm member 20 or the linear position of thumbpiece 28. This orthogonal relationship eliminates undesirable interaction between the trigger control and the positioning controls and thus prevents cursor creep. A user, when exerting a downward pressure on thumbpiece 28, is not likely to inadvertently pivot or extend/curl the thumb (which would cause a change in the positioning of the cursor). Thus, by isolating the trigger and positioning controls, as described above, interface control 10 provides advantages over conventional joystick controllers which suffer from cursor creep problems.

Figure 6:
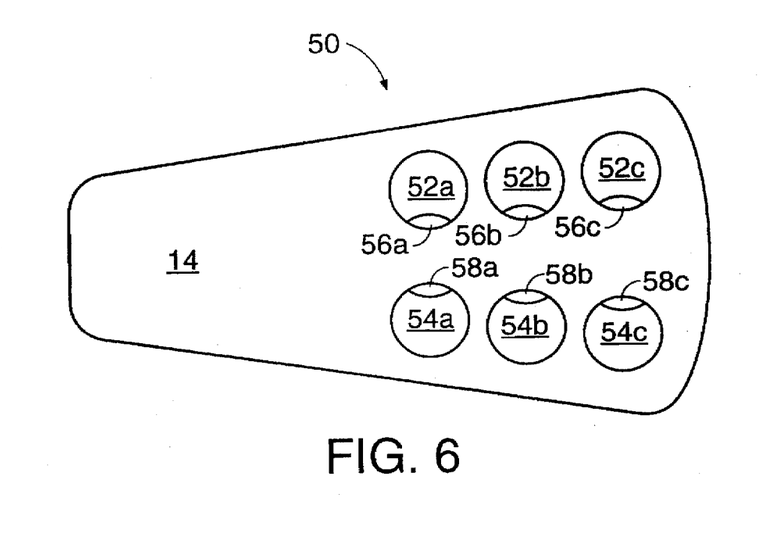
FIG. 6 shows another embodiment in accordance with the present invention.

FIG. 6 shows another embodiment of the present invention. Interface control 50, the operation of which is identical to that of interface control 10, includes all the components of interface control 10 plus additional features described below. Interface control 50 includes two groups of cavities 52a, 52b, and 52c and 54a, 54b, and 54c formed in the bottom surface of base plate 14. When a user cradles interface control 50 in the left hand, the tips of the three fingers closest to the thumb may comfortably rest within associated cavities 52a–52c. Each of cavities 52a, 52b, and 52c has an associated switch 56a, 56b, 56c, respectively, disposed therein so that each of the user's fingers may activate one of associated switches 56a, 56b, 56c while holding interface control 50. Switches 56a, 56b, 56c, when depressed by the user's finger tips, generate second, third, and fourth trigger control signals, respectively, for implementing additional predetermined functions.

In a similar manner, a right-handed user may place one of the three fingers closest to the thumb (of the right hand) in each of cavities 54a, 54b, and 54c to operate associated switches 58a, 58b, 58c, which, like switches 56a, 56b, 56c, generate second, third, and fourth trigger control signals, respectively, for implementing various predetermined functions.

If additional control signals are desired for implementing even more predetermined functions, control circuitry may be added so that the simultaneous depression of two of more switches 56a, 56b, 56c (or 58a, 58b, 58c for right-handed users) generate these additional control signals. For instance, simultaneously depressing switches 56a and 56b (for left-hand operation) or 58a and 58b (for right-hand operation) may generate a fifth trigger control signal.

Figure 7:
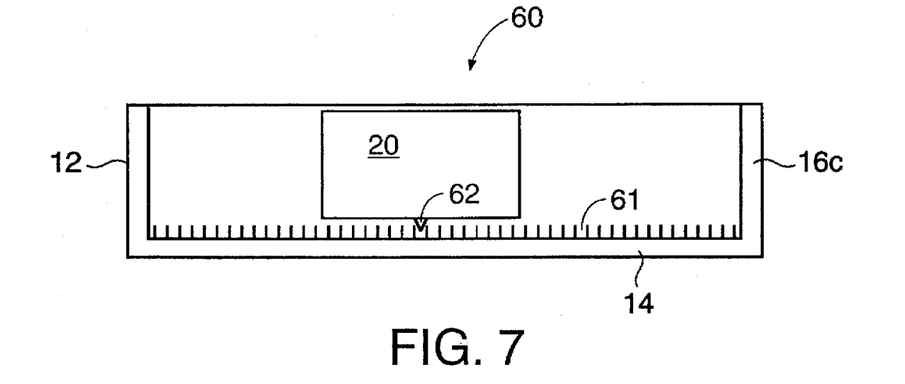
FIG. 7 is an end view of another embodiment in accordance with the present invention.

FIG. 7 is an end view of another embodiment in accordance with the present invention. Interface control 60, which operates in a manner identical to interface control 10 (FIGS. 2, 3A, 3B, 4, and 5), includes a plurality of first detents 61 formed on the top surface of base plate 14. One second detent 62 is provided on the bottom surface of arm member 20 such that as arm member 20 pivots about point 22 (not shown), second detent 62 moves between pairs of the plurality of first detents 61. Arm member 20 may preferably come to rest only at those positions where second detent 62 is positioned between a pair of first detents 61, thereby providing arm member 20 with a discrete number of click stops. These click stops may add increased stability and control to the positioning controls of interface control 60.

The embodiments in accordance with the present invention are advantageous over conventional joystick controllers. Indeed, interface controls 10 and 50 are suitable for one-handed operation, thereby leaving the user's other hand free to perform other tasks. This one-handed operation also eliminates the need for a flat surface, as required when using a mouse or operating conventional joystick interface controls with one hand.

Using the thumb to control positioning functions contributes to the superior ergonomics of interface controls 10 and 50. As mentioned above, conventional joystick controllers require various combinations of wrist and arm movements to control the positioning of a cursor and additional finger or thumb motions to control trigger functions. Such unnatural combinations of motions necessitate training and practice in order for a user to become proficient. This is especially true as the size of such a control is reduced. Unlike conventional controllers, embodiments in accordance with the present invention (1) isolate the horizontal and vertical positioning functions from each other and (2) isolate the positioning functions from the trigger functions while simultaneously allowing both functions to be controlled by a single user contact point. The result is an interface control which allows users to issue vertical and horizontal positioning commands in concert for smooth and precise motions along both axes (i.e., a diagonal motion), as well as implementing trigger functions without inadvertently altering those positioning commands. Further, the interface controls described herein allow users to control both positioning and trigger control functions with simple, intuitive thumb motions.

When a user traces his or her thumb across the tips of the fingers, every joint in his or her hand moves in concert to facilitate the thumb's motion. This opposed position of a user's thumb relative to his or her fingers and palm is utilized by interface controls 10 and 50 to achieve a comfortable and natural interface between the user and a machine (such as a computer). Indeed, by positioning a user's fingers along the bottom surface of base plate 14 and his or her thumb in thumbpiece 28, interface controls 10 and 50 operate in a manner consistent with the thumb's natural motions. By taking advantage of the thumb's full arcuate motion about the large thumb joint and the thumb's excellent linear motion, interface controls in accordance with the present invention allow a user to quickly and easily position a cursor or pointer on a display screen. The superior ergonomics of the above interface controls afford users a high degree of precision and efficiency without the extensive practice and training required of conventional joystick controllers. This accuracy and ease of use makes the present interface controls especially well suited for CAD or any other computer illustration systems.

The frictional coupling between elements of the preferred embodiments may be manipulated to adjust the "feel" of interface controls 10 and 50. For instance, contact surface 38 (FIGS. 4 and 8) of thumbpiece 28 may be shaped with respect to the top surfaces of sidewalls 20a, 20b so that the sides of a user's thumb are in frictional contact with sidewalls 20a, 20b. This frictional contact may increase the stability with which thumbpiece 28 slides along arm member 20, thereby increasing the accuracy of vertical positioning of a cursor.

In a similar manner, the frictional coupling between third sensor 44 (FIG. 3A) and the top surface of base plate 14 of housing 12 may be adjusted to increase the accuracy of the horizontal positioning control of interface controls 10 and 50. For example, a strip of Teflon material (not shown) may be provided between third sensor 44 and bottom plate 14 to achieve a desirable "silky" feel when a user pivots arm member 20 about point 22 (FIG. 4). The Teflon causes drag to progressively increase as thumbpiece 28 is depressed, without any significant increase in static friction. This resultant increase in drag contributes to an increased stability in performing drag-select operations in which the trigger switch is depressed while the cursor is moved from a first position to a second position (as in highlighting text in word processing programs).

Figure 8:
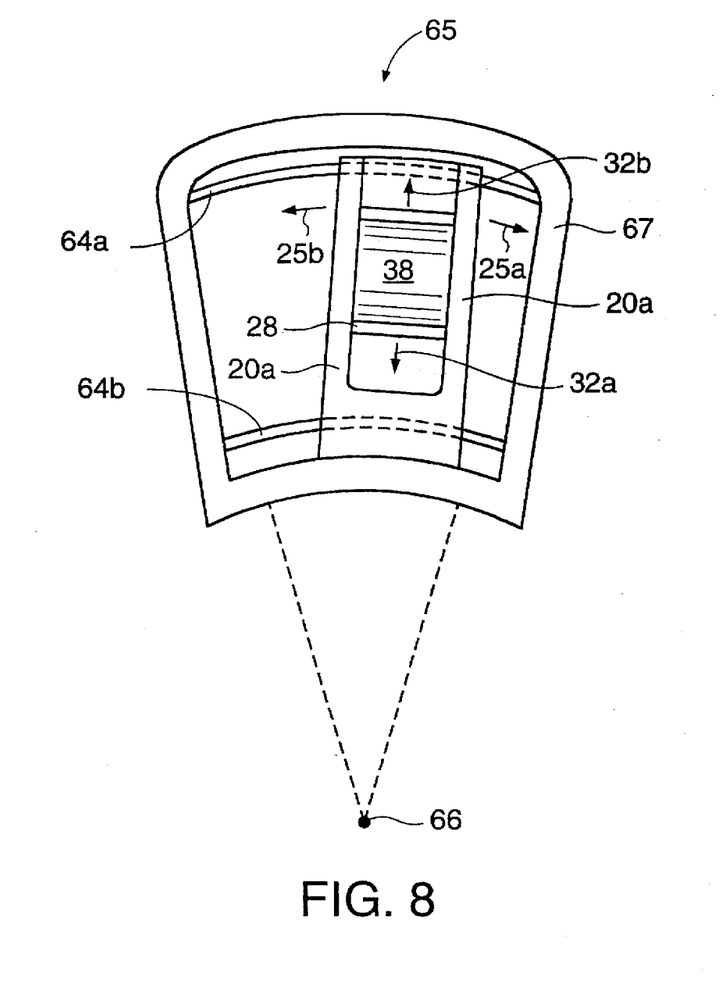
FIG. 8 is a plan view of yet another embodiment in accordance with the present invention.

FIG. 8 shows another embodiment in accordance with the present invention. Interface control 65 includes arm member 29 slidably disposed on conventional curved guide tracks 64a, 64b within support 67. Tracks 64a, 64b define an arcuate path having as its center virtual pivot point 66. Arm member 29 slides along this arcuate path as indicated by arrows 25a, 25b as if arm member 29 were pivoting about virtual pivot point 66. Disposing arm member 29 within tracks 64a, 64b in this manner eliminates the need for arm member 29 to be coupled to a fixed pivot point, as is arm member 20 of interface control 10 (FIGS. 2, 3A, 3B, 4, and 5), and therefore allows for interface control 65 to be of a significantly smaller size. Thumbpiece 28 is slidably disposed within arm member 29 and slides along the length of arm member 29 as indicated by arrows 32a, 32b.

The positioning and trigger functions of interface control 65 are controlled in a manner identical to those of interface control 10 as described above (see FIGS. 2, 3A, 3B, 4, and 5) and will thus not be described here. Interface control 65 possesses all of the advantages discussed above with respect to interface control 10, including allowing users to control the operation of applications with simple and intuitive motions that closely emulate the natural motions of the human thumb and isolates positioning controls (1) from each other and (2) from trigger controls as described above. Likewise, interface control 65 may be also be provided with the friction coupling and feedback features described above.

The embodiments described above may be used in virtually any application which requires an interface control between a user and a machine. Embodiments in accordance with the present invention may be used to control the operation of a construction crane or boom. Interface controls 10 and 50 are ideal for replacing the mouse or trackball in computer software applications such as word processing, databases, and spreadsheets. For instance, interface control 50 of FIG. 6 (see also FIGS. 2, 3A, 3B, 4, and 5) is well suited for use with video games. As described above, thumbpiece 28 may be used to control the positioning of a character in the video game. By depressing thumbpiece 28 so as to activate third sensor 44, the user may implement various predetermined functions, such as starting/stopping the game and selecting game options. Switch 56a (58a for right-handed users) may, for instance, cause the character to jump. Switch 56b (58b) may cause the character to fire a bullet, and so on.

Figure 9:
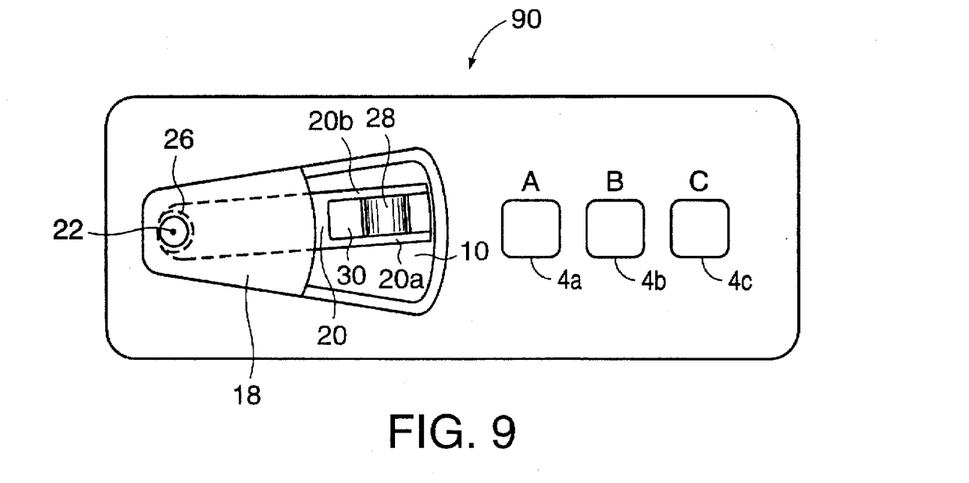
FIG. 9 shows the embodiment of FIG. 2 used in conjunction with the prior art controller of FIG. 1.

Embodiments of the present invention may also be incorporated into conventional two-handed video game controllers (see FIG. 1) to provide a superior video game interface control. For example, positioning control keys 2a, 2b, 2c, and 2d (FIG. 1) may be replaced by interface control 10, as illustrated in FIG. 9. Two-handed video game controller 90 has disposed within a first portion thereof a portion of interface control 10 of FIGS. 2, 3A, 3B, and 4. For purposes of clarity, not all of the components of interface control 10 are labelled. Arm member 20 and thumbpiece 28 control the positioning of objects (i.e., characters of a video game) displayed on a screen in the same manner as described previously with reference to FIGS. 2, 3A, 3B, and 4, while keys 4a, 4b, and 4c implement various trigger functions.

The above described interface controls may be mounted in virtually any enclosure, including (but not limited to) control panels, automobile dashboards, steering wheels, or handgrips of other interface controls. For instance, in one such embodiment, base plate 14 (FIG. 2) may be disposed within the handgrip portion of a floor-mounted lever arm control, i.e., a transmission selector in a vehicle, to provide users with a superior means to control such things as the vehicle's navigation system or communications with the vehicle's on-board computer system.

In another embodiment, interface controls in accordance with the present invention may be disposed within a control panel such as the dashboard of an automobile, boat, or even an airplane to provide control over certain operations. For example, interface control 10 may be mounted in the control panel of construction equipment to control the operation of a boom or crane. A control panel-mounted interface control 10 could also be used to manually control, for instance, the processing operations of an industrial application or the positioning and firing of lasers in medical applications. These embodiments, like those discussed above, are advantageous since multiple control functions (1) are disposed on a single contact surface and (2) are isolated from one another.

Some of the ergonomic advantages discussed herein may be compromised in order to provide a user interface control capable of controlling positioning in three, rather than two, directions. In one such embodiment in accordance with the present invention, various elements of interface control 10 may be incorporated into the handgrip of a conventional full-size joystick to provide three-dimensional positioning control as well as trigger functions.

Figure 10:
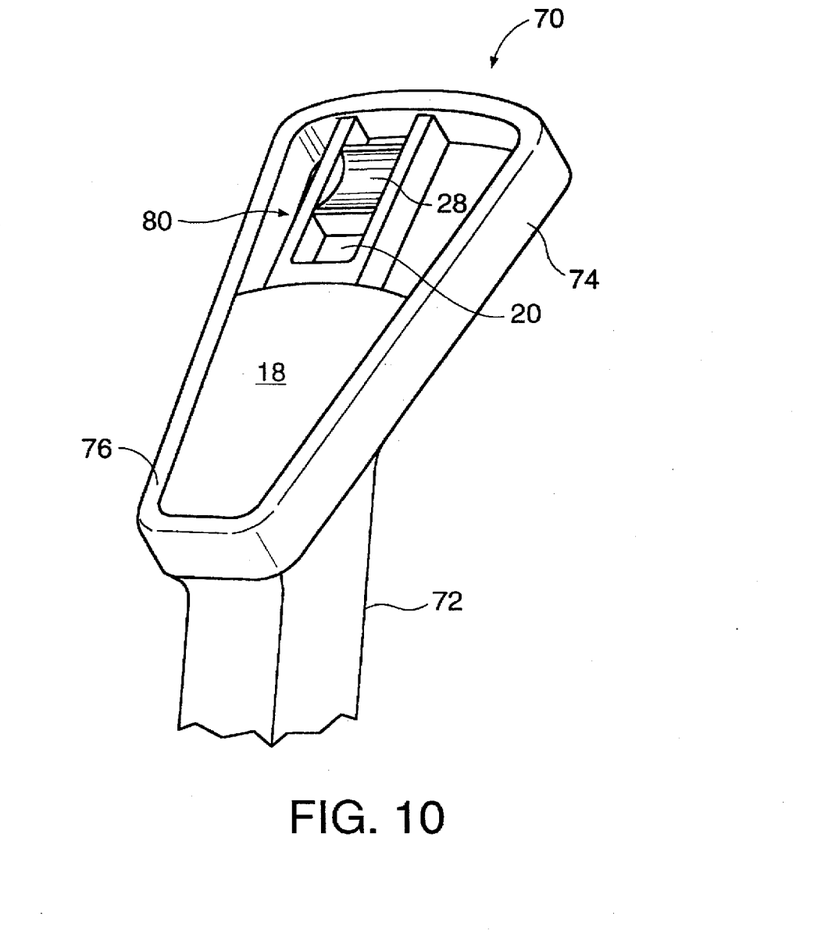
FIGS. 10, 11 and 12 are plan views of three other embodiments in accordance with the present invention.

FIG. 10 shows interface control 70 including gimballed stick 72 having formed at one end an inclined, elongated upper portion 74. Formed within top surface 76 of upper portion 74 is secondary interface control 80 which includes all the features of and operates in a similar manner to interface control 10 (FIGS. 2, 3A, 3B, and 4). Secondary interface control 80 preferably has thumbpiece 28 fixably mounted within arm member 20 so that thumbpiece 28 may not slide along arm member 20, thereby eliminating the need for second sensor 42 as well as grooves 34a, 34b and flanges 36a, 36b (FIG. 4). The other end of stick 72 (FIG. 10) is pivotally mounted to a base portion (not shown) having sensors which generate first and second positioning signals in response to stick 72 pivoting with respect to the base portion, as discussed above in reference to conventional joystick controllers.

A user curls the four fingers of his or her hand around stick 72 and places the thumb in thumbpiece 28 (FIG. 10). The user controls the horizontal and vertical positioning of, for instance, a cursor displayed on a CRT in a conventional manner as described above, i.e., by pivoting stick 72 about the base portion. The user controls the depth positioning of the cursor with the thumb by pivoting arm member 20 about pivot point 22 (see FIG. 2). Trigger functions are activated by pressing downward on thumbpiece 28 (as discussed in reference to interface control 10).

Various forms of feedback may be added to the above described embodiments to provide a user with additional information about the particular application he or she is controlling, as described below in reference to FIGS. 11 and 12. For instance, arm member 20 of interface control 10 (FIGS. 2, 3A, 3B, and 4) may be fitted with a first actuator that in response to a first feedback signal prevents arm member 20 from further pivoting in one or both directions or, in the alternative, alters the frictional contact between arm member 20 and base plate 14 so as to alter the ease with which arm member 20 pivots.

Figure 11:
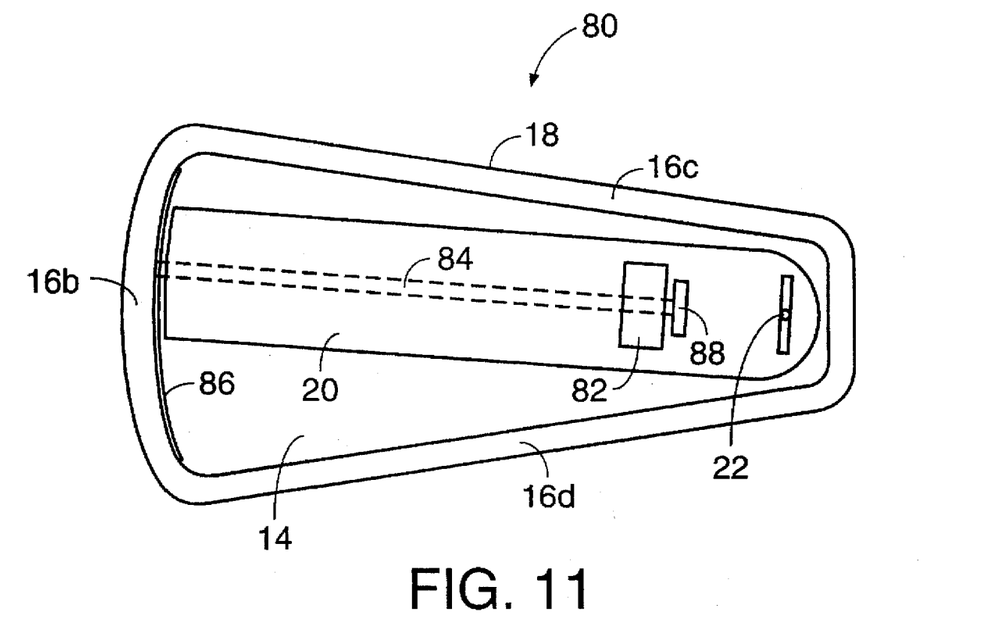

Referring to FIG. 11, interface control 80, the operation of which is identical to that of interface control 10, includes all of the components of interface control 10 plus additional features described below. For purposes of clarity, not all of the components of interface control 80 common with those of interface control 10 are shown. Arm member 20 of interface control 80 has coupled thereto electromagnetic coil 82 which, in turn, is wound around a conventional ferrous core (not shown). Shaft 84 extends along arm member 20 and has a first end matingly coupled to surface 86 of sidewall 16b. A second end of shaft 84 extends through coil 82 and is coupled to iron armature 88. Armature 88 is preferably positioned as close to coil 82 as possible. When a first feedback current is provided to coil 82, the resultant magnetic field produced by coil 82 attracts armature 88 towards coil 82, thereby causing the first end of shaft 84 to shift towards and press against surface 86 of sidewall 16b. The resultant increase in frictional coupling between arm member 20 and sidewall 16b resists any pivoting movement of arm member 20 about point 22. In other words, coil 82, shaft 84, and armature 88 act as a magnetically activated brake. Varying levels of feedback current will result in proportionally varying levels of drag. This brake may be implemented to simulate detents, stops, or other forms of reflective feedback.

Figure 12:
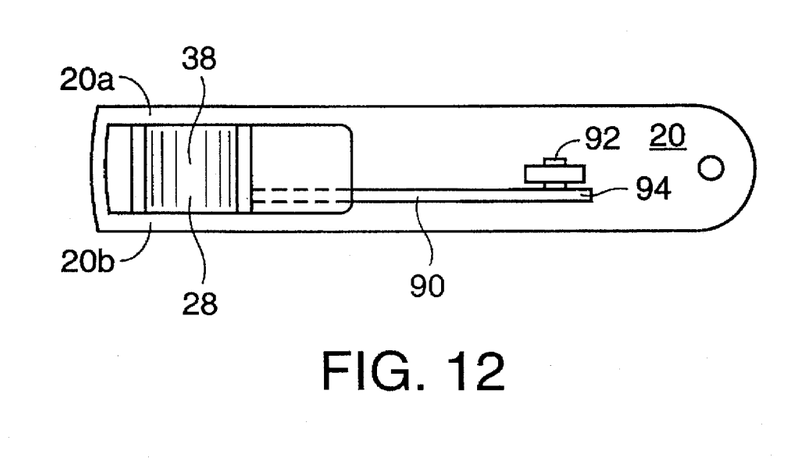

In a similar manner, a second actuator may be provided that in response to a second feedback signal inhibits the movement of thumbpiece 28 along arm member 20, as illustrated in FIG. 12. Arm member 20 has provided therein a sliding bar 90 having a first end coupled to thumbpiece 28. Iron core 92 is coupled to arm member 20 and is positioned in a region proximate to a second end of bar 90. Magnetic coil 94 is wound around ferrous core 92. A second feedback current provided to coil 94 will induce a magnetic attraction between bar 90 and against core 92, thereby resulting in an increased frictional coupling between bar 90 and core 92. This increased frictional coupling resists the sliding motion of thumbpiece 28 along arm member 20. Note that in some embodiments shaft 40 (FIG. 3A) (not shown in FIG. 12 for simplicity) may also serve the same function as bar 90 in addition to being part of the longitudinal sensing structure of arm member 20.

The embodiments described above and illustrated in FIGS. 11 and 12 would, for instance, be especially well suited for use with applications in which it is desirable to preclude a user from selecting certain options or moving a cursor into certain areas. In a video game application, for instance, the game's character may be precluded from entering a restricted area of the displayed image. The video game may issue feedback signals as discussed above to preclude the user from causing the character to move into the restricted areas. Thus, the feedback signals, by restraining or even preventing (1) arm member 20 from pivoting about point 22 and/or (2) thumbpiece 28 from sliding along arm member 20 directly inform the user he can no longer move in that direction. In a similar manner, an additional actuator may be contained within third sensor 44 (see FIG. 3A) to preclude activation of trigger functions at certain predetermined character positions. Unlike conventional interface control feedback systems which use flashing lights or sounds to warn users of an improper selection or movement, the direct force-reflecting feedback described above, by preventing the user from effecting certain positioning commands, provides a realistic feel to video games and other applications.

In other applications, interface control 80 (FIG. 11) may be used to facilitate the selection of options or icons. As the user moves the cursor or pointer over an icon displayed on a screen, feedback signals generated by the application may simulate a detent by increasing the frictional coupling between arm member 20 and sidewall 16b and between thumbpiece 28 and arm member 20, as described above with reference to FIGS. 11 and 12, when the cursor or pointer is positioned near or overlaps certain icons displayed on the screen. This simulated detent varies the amount of force the user must exert to effect further positioning changes in certain directions, i.e., the detent may either make it easier or harder for the user to cause the cursor to pass across the icon. In this manner, the user can "feel" when he or she has reached a particular icon (or any other specific screen location). This simulated detent may be deactivated when, for instance, the icon has been selected or when the cursor has passed over the icon.

The actuators discussed above may comprise a solenoid, a servomotor, or any other suitable device known in the art which generates a force in response to electric signals. The actuators may also employ shape-memory alloys, piezo ceramics, or electro-rheological compounds. Further, motor-type actuators may be employed to augment or restrain motion.

In other embodiments, the actuators discussed above may used to activate and deactivate electrically controlled detents so as to provide tactile click stops in the pivoting motion of arm member 20 (FIG. 2) about point 22 or in the linear motion of thumbpiece 28 along arm member 20. These detents may be logically correlated with specific targets or options on a display screen such that once a particular option is selected, its corresponding detent is electrically deactivated. Adaptive feedback of this type can be very effective in making the above-described controls more intuitive.

Embodiments of the present invention may also be equipped with a spring return mechanism. With reference to interface control 10 (FIG. 2), a centering spring may be coupled to arm member 20 which causes arm member 20 to return to its center position whenever arm member 20 has deviated from the center position by exerting pressure on arm member 20. A manually controlled latch may also be provided which engages the centering spring to and disengages the centering spring from arm member 20 so as to turn on and off the centering mechanism. Such a centering mechanism is useful in applications requiring proportional control (i.e., a conventional joystick) rather than absolute control (i.e., a mouse). The centering spring may also be electrically actuated by an external signal from the interfaced device (i.e., computer, video game, and so on). Inclusion of such an electrically actuated spring allows the interfaced device to switch the controller between two modes of operation (spring centering and non-centering), as the particular application may require. In a similar manner, an additional centering spring may be coupled to thumbpiece 28 to provide proportional control in the vertical direction.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

I claim:

1. An apparatus for generating at least two control signals, said apparatus comprising:

a support;

an arm member disposed within said support, said arm member being moveable in an arcuate path within said support;

a contact member slidably mounted on said arm member, said contact member being slidable along said arm member;

a first sensor coupled to said arm member for sensing movement of said arm member along said arcuate path; and a second sensor coupled to said contact member for sensing linear movement of said contact member along said arm member.

2. The apparatus of claim 1 further comprising:

first guide means disposed along said arm member; and second guide means disposed on said contact member, said second guide means matingly coupled with said first guide means so as to facilitate the movement of said contact member along said arm member.

3. The apparatus of claim 2 wherein said first guide means comprise first and second grooves horizontally disposed in first and second side walls, respectively, of said arm member, said second guide means comprising first and second flanges disposed on first and second side walls of said contact member, respectively.

4. The apparatus of claim 1 wherein said arm member is pivotally coupled to said support at a pivot point, said arm member moving in said arcuate path as said arm member pivots about said pivot point.

5. The apparatus of claim 1 further comprising:

a track means disposed within said support, said track means defining said arcuate path; and one or more guide elements disposed on an outer surface of said arm member, said one or more guide elements being matingly coupled to said track means for facilitating the movement of said arm member in said arcuate path.

6. The apparatus of claim 1 wherein said first sensor detects the magnitude and direction of arcuate movement of said arm member along said arcuate path and generates a first control signal in response thereto.

7. The apparatus of claim 1 wherein said second sensor detects the magnitude and direction of linear movement of said contact member and generates a second control signal in response thereto.

8. The apparatus of claim 1 further comprising a third sensor coupled to said arm member, said third sensor detecting a downward pressure on said contact member and in response thereto generating a signal for implementing a first predetermined function.

9. An apparatus for generating at least two control signals, said apparatus comprising:

a support;

an arm member having a first end portion pivotally coupled to said housing at a point, said arm member being rotatable about said point;

a contact member slidably mounted on said arm member, said contact member being slidable along said arm member;

a first sensor coupled to said arm member for sensing arcuate movement of said arm member; and a second sensor coupled to said contact member for sensing linear movement of said contact member along said arm member.

10. The apparatus of claim 9 wherein said support is of a size such that said apparatus is capable of being operated with one hand of a person.

11. The apparatus of claim 9 wherein said first sensor generates a first control signal representing the angle and direction of rotation of said arm member, said first control signal being capable of being used to alter the position of a cursor or pointer in a first direction on a display screen.

12. The apparatus of claim 9 wherein said second sensor generates a second control signal representing the magnitude and direction of linear movement of said contact member, said second control signal being capable of being used to alter the position of a cursor or pointer in a second direction on a display screen.

13. The apparatus of claim 9 further comprising a third sensor disposed on said arm member, said third sensor detecting a downward pressure on said contact member.

14. The apparatus of claim 13 wherein said third sensor generates a third control signal indicative of said downward pressure on said contact member, said third control signal implementing a first predetermined function.

15. The apparatus of claim 9 further comprising a first actuator, wherein in response to a first feedback signal said first actuator restrains said rotation of said arm member.

16. The apparatus of claim 15 wherein said first actuator is contained within said first sensor.

17. The apparatus, of claim 15 further comprising a second actuator, wherein in response to a second feedback signal said second actuator restrains the linear movement of said arm member.

18. The apparatus of claim 17 wherein said second actuator is contained within said second sensor.

19. The apparatus of claim 9 wherein said contact member has a concave upper surface so that a human thumb may matingly situate on said contact member.

20. The apparatus of claim 9 wherein said arm member has disposed therein one or more first guide means, said contact member having disposed thereon one or more second guide means, each of said first guide means being matingly coupled with an associated one of said second guide means for facilitating sliding of said contact member along said arm member.

21. The apparatus of claim 20 wherein said first guide means comprise first and second grooves horizontally disposed in first and second side walls, respectively, of said arm member, said second guide means comprising first and second flanges disposed on first and second side walls of said contact member, respectively.

22. The apparatus of claim 9 wherein said housing has a bottom surface, said apparatus further comprising:

one or more cavities formed in said bottom surface of said housing;

one or more switches, each of said switches being associated with and coupled to an associated one of said cavities.

23. The apparatus of claim 22 wherein said switches comprise pressure sensitive devices, the actuation of which generates one or more fourth control signals for implementing one or more second predetermined functions.

* * * * *